United States Patent [19]

Tashiro

[11] Patent Number: 5,410,873
[45] Date of Patent: May 2, 1995

[54] APPARATUS FOR DIMINISHING NITROGEN OXIDES

[75] Inventor: Yoshihisa Tashiro, Kamakura, Japan
[73] Assignee: Isuzu Motors Limited, Tokyo, Japan
[21] Appl. No.: 146,097
[22] PCT Filed: Jun. 1, 1992
[86] PCT No.: PCT/JP92/00708
  § 371 Date: Nov. 9, 1993
  § 102(e) Date: Nov. 9, 1993
[87] PCT Pub. No.: WO92/21871
  PCT Pub. Date: Dec. 10, 1992

[30] Foreign Application Priority Data
  Jun. 3, 1991 [JP] Japan .................. 3-160088
  Jun. 5, 1991 [JP] Japan .................. 3-161027
  Jun. 5, 1991 [JP] Japan .................. 3-161028

[51] Int. Cl.⁶ .......................... F01N 3/20
[52] U.S. Cl. ........................ 60/276; 60/285; 60/286; 123/681
[58] Field of Search ........... 60/274, 276, 277, 285, 60/286; 123/672, 681, 703

[56] References Cited

U.S. PATENT DOCUMENTS

| | | | |
|---|---|---|---|
| 3,982,393 | 9/1976 | Masaki | 60/285 |
| 4,051,672 | 10/1977 | Masaki | 60/285 |
| 4,134,261 | 1/1979 | Iizuka | 60/285 |
| 4,756,155 | 7/1988 | Shinzawa | 60/285 |

FOREIGN PATENT DOCUMENTS

| | | |
|---|---|---|
| 55-93917 | 7/1980 | Japan . |
| 57-168040 | 10/1982 | Japan . |
| 58-6045 | 2/1983 | Japan . |
| 60-28243 | 2/1985 | Japan . |
| 61-197740 | 9/1986 | Japan . |
| 64-83816 | 3/1989 | Japan . |
| 3-217640 | 9/1991 | Japan . |

Primary Examiner—Ira S. Lazarus
Assistant Examiner—Daniel J. O'Connor
Attorney, Agent, or Firm—Spencer, Frank & Schneider

[57] ABSTRACT

An apparatus for diminishing the amount of $NO_x$ in the exhaust gases of an engine by a catalytic converter installed in its exhaust system. The apparatus includes an injector associated with the intake system of the engine, or the exhaust system upstream of the catalytic converter for injecting fuel into the intake, or exhaust system to ensure that the catalytic converter receives a sufficient supply of hydrocarbon. The amount of $NO_x$ in the exhaust gases leaving the engine is estimated from the number of revolutions thereof and the angle of a control lever, or the concentration of $NO_x$ in the exhaust gases leaving the catalytic converter is detected by a sensor. The amount of fuel injection into the intake, or exhaust system is controlled in accordance with the estimated amount of $NO_x$, or the output of the sensor.

9 Claims, 7 Drawing Sheets

APPARATUS FOR DIMINISHING NITROGEN OXIDES

BACKGROUND OF THE INVENTION

1. Technical Field

This invention relates to an apparatus for diminishing the amount of nitrogen oxides ($NO_x$) in the exhaust gases of an automobile.

2. Background Art

There is known an apparatus which is designed for diminishing the amount of $NO_x$ in the exhaust gases of a diesel engine by supplying a reducing agent, such as ammonia, into the exhaust gases. For example, the Japanese Patent Application laid open under No. 83816/1989 discloses an by an $NO_x$ analyzer, and blows ammonia into the exhaust gases apparatus which detects the amount of $NO_x$ in exhaust gases in accordance with the amount of NO as detected. The use of ammonia, however, calls for a great deal of care, as it has an objectionable odor.

There is also known an apparatus which relies upon a catalytic converter incorporated in the exhaust system of an automobile for diminishing the amount of $NO_x$ in its exhaust gases. The catalytic converter relies upon hydrocarbon for its reducing action, but the exhaust gases do not contain a sufficiently large amount of hydrocarbon for the action of the catalytic converter. Therefore, the known apparatus fails to diminish the amount of $NO_x$ effectively.

SUMMARY OF THE INVENTION

It is, therefore, an object of this invention to provide an apparatus which can supply a sufficiently large amount of hydrocarbon for a catalytic converter to effectively diminish the amount of $NO_x$.

According to a first aspect of this invention, the object thereof is attained by an apparatus for diminishing the amount of $NO_x$ in the exhaust gases of an engine of the type in which fuel is injected into its cylinders, which comprises an injector associated with the intake system of the engine for injecting fuel into the intake system, means for calculating the amount of $NO_x$ in the exhaust gases from the rotating speed of the engine and the angle of a control lever, and means for controlling the injection of the fuel by the injector in accordance with the load of the engine and the amount of $NO_x$ as calculated.

According to a second aspect of this invention, there is also provided an apparatus for diminishing the amount of $NO_x$ in the exhaust gases of an engine of the type as defined above, which comprises an injector associated with the intake system of the engine for injecting fuel into the intake system, a sensor for $NO_x$ installed downstream of a catalytic converter in the exhaust pipe of the engine, and a controller for controlling the injection of the fuel by the injector in accordance with the load of the engine and the output of the sensor.

According to a third aspect of this invention, there is provided an apparatus for diminishing the amount of $NO_2$ in the exhaust gases of an engine, which comprises an injector associated with the exhaust system of the engine for injecting fuel into the exhaust system between the engine and a catalytic converter in the exhaust pipe of the engine, a sensor for $NO_x$ installed downstream of the catalytic converter, and means for controlling the injection of the fuel by the injector in accordance with the load of the engine and the output of the sensor.

The material employed in the apparatus of this invention for diminishing $NO_x$ is a common fuel which is easy to handle, since it does not have an objectionable odor such as that present when ammonia is used. The injection of the fuel into the intake or exhaust system of the engine also produces the effect of diminishing smoke.

DESCRIPTION OF THE PREFERRED EMBODIMENTS

It is known that zeolite forms a catalyst which is useful for diminishing the amount of $NO_x$ in the exhaust gases of a diesel engine, and the non-selective catalytic reduction which employs a zeolite catalyst is expected to be an effective method for that purpose. This method is carried out in the presence of carbon monoxide, hydrocarbon, hydrogen or carbon, and hydrocarbon, among others, plays an important role in the catalytic reduction of $NO_x$.

The effective reduction of $NO_x$ requires the presence of hydrocarbon in an amount which is larger than that of the $NO_x$ to be reduced. The amount of hydrocarbon which usually occurs in a diesel engine is, however, smaller than that of the $NO_x$ which its exhaust gases usually contain. It is, therefore, necessary to supply an additional amount of hydrocarbon for the effective reduction of $NO_x$. According to this invention, the additional supply of hydrocarbon is effected by the injection of fuel into the intake system of an engine, or into its exhaust system upstream of a catalytic converter.

Description will now be made of a number of examples of apparatus embodying this invention with reference to the accompanying drawings.

FIRST EXAMPLE

Figure 1:
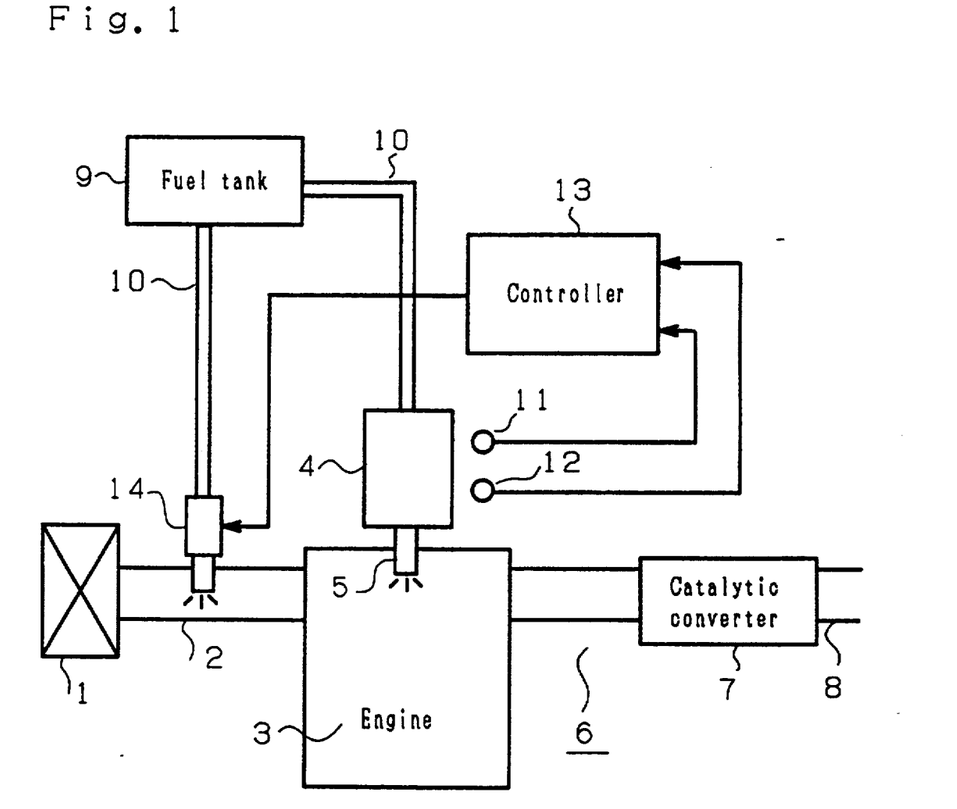
FIG. 1 is a diagram showing a first example of an apparatus embodying this invention.

Reference is first made to FIG. 1 showing a first example of apparatus embodying this invention. FIG. 1 shows a filter 1, an intake system 2, an engine 3, a fuel injection pump 4, an injector 5 for injecting fuel into an engine cylinder, an exhaust system 6, a catalytic converter 7, the outlet portion 8 of an exhaust pipe, a fuel tank 9, fuel pipes 10, an engine rotation sensor 11, a control lever sensor 12, a controller 13, and an injector 14 for injecting fuel into the intake system.

The intake system 2 includes an intake pipe and an intake manifold, and the exhaust system 6 includes the exhaust pipe and an exhaust manifold. The injector 14 associated with the intake system 2 injects the same fuel as that which is injected into the engine 3.

The fuel injected into the intake system 2 by the injector 14 enters the cylinders of the engine in the form of a lean fuel-air mixture, but the greater part thereof remains uncombusted when leaving the engine into the exhaust system 6, unlike the fuel injected into the cylinders by the injector 5. As a result, the exhaust gases in the exhaust system 6 contain a larger amount of hydrocarbon than the exhaust gases of an ordinary diesel engine having no such fuel injection as by the injector 14. The hydrocarbon is used for effective reduction in the catalytic converter 7.

Figure 2:
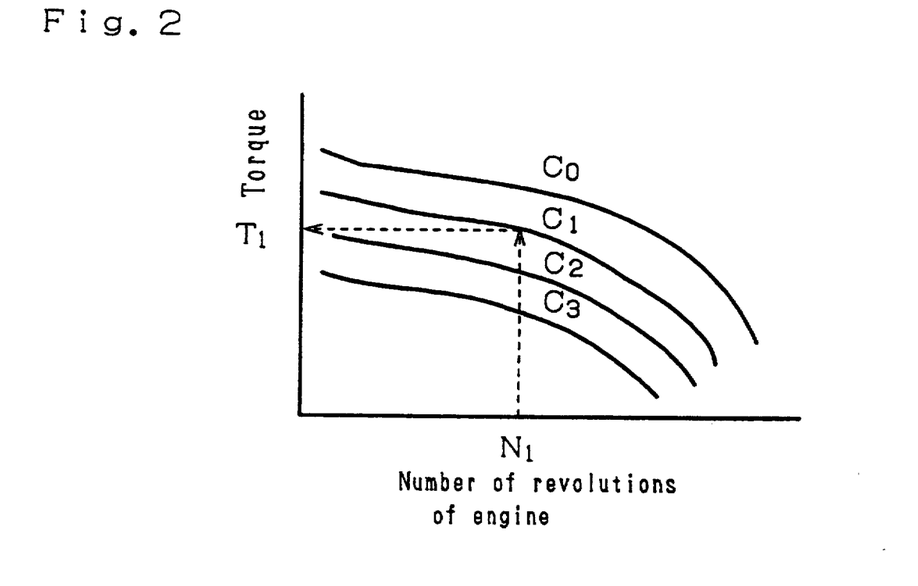
FIG. 2 is a graph showing the relation as observed between the rotating speed (number of revolutions) of an engine and the torque thereby produced, when the angle of a control lever is employed as a parameter.

FIG. 2 shows the number of revolutions of the engine and the torque thereby produced with the angle $C_0$, $C_1$, $C_2$ or $C_3$ of a control lever employed as a parameter. The relationship shown in FIG. 2 is used for determining the torque, while the number of revolutions of the engine and the angle of the control lever are detected by the engine rotation sensor 11 and the control lever sensor 12, respectively. If, for example, the number of revolutions of the engine is $N_1$, and the angle of the control lever, $C_1$, the torque is $T_1$, as indicated by broken lines; in FIG. 2.

Figure 3:
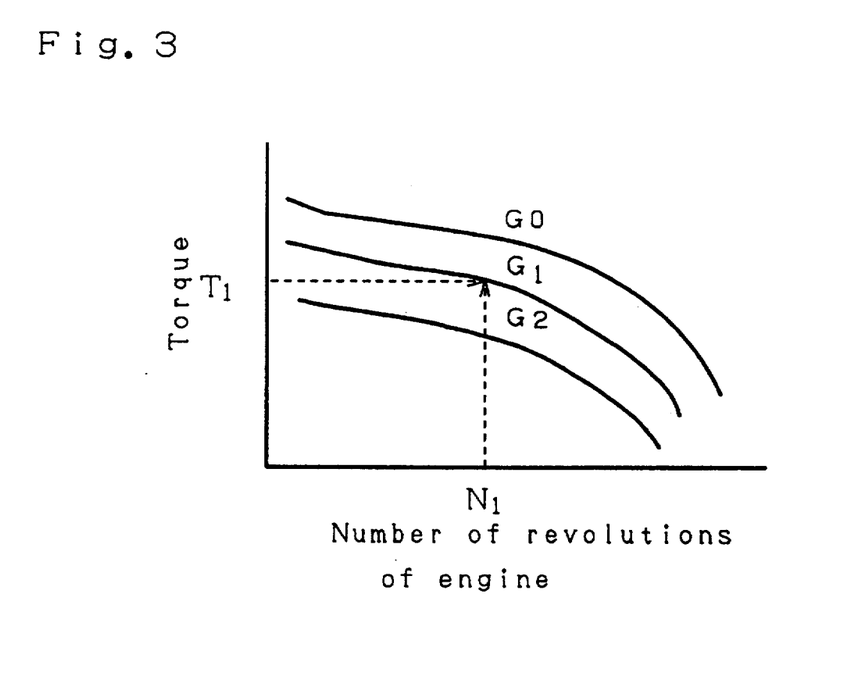
FIG. 3 is a graph similar to FIG. 2, but showing the relation when the amount of $NO_x$ is employed as a parameter.

FIG. 3 shows the number of revolutions of the employed as a parameter. The relationship shown in FIG. 3 is used for determining the amount of $NO_x$ which is indicated by the curve on which the torque determined from FIG. 2 meets the number of revolutions of the engine as detected by the engine rotation sensor 11. If, for example, the torque is $T_1$, and the number of revolutions of the on the curve indicating the amount of $NO_x$ as $G_1$.

Figure 4:
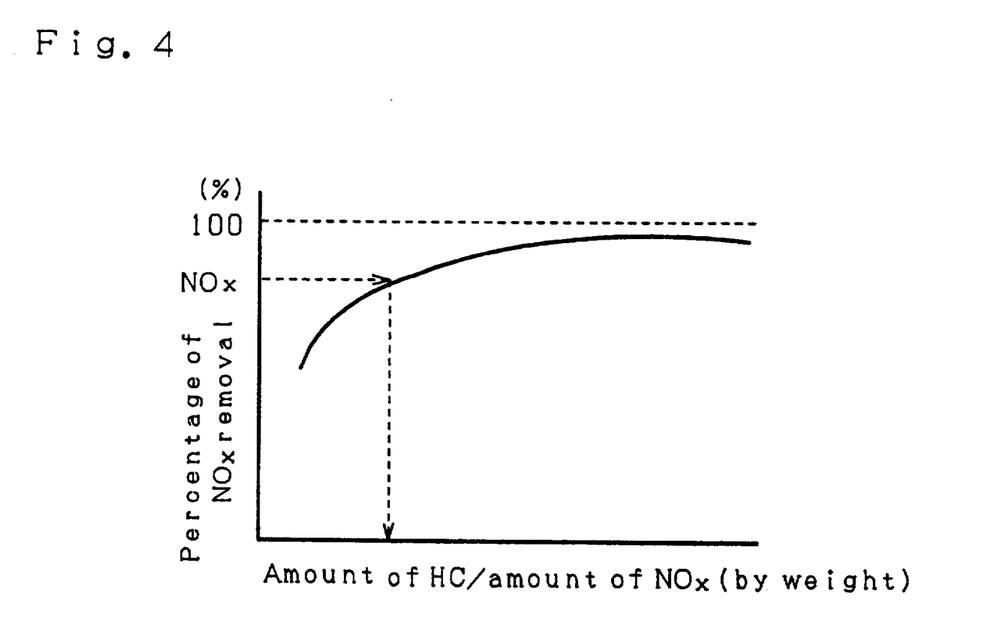
FIG. 4 is a graph showing the percentage of $NO_x$ removal in relation to the ratio of the amount of hydrocarbon to that of $NO_x$.

FIG. 4 shows the ratio of the amount of hydrocarbon relationship shown in FIG. 4 is used for determining the amount of hydrocarbon which is required, as will hereinafter be explained. It is obvious from FIG. 4 that an increase in the amount of hydrocarbon brings about a higher percentage of $NO_x$ removal The rise of the curve in FIG. 4, however, becomes more gradual, as it approaches a broken line indicating 100% of $NO_x$ removal. In other words, a larger amount of hydrocarbon becomes necessary to achieve a smaller increase in the percentage of $NO_x$ removal toward 100%. This is not desirable from the standpoint of efficiency. Therefore, the removal of $NO_x$ to 100% is not aimed at, but it is to achieve an appropriate percentage of $NO_x$ removal which is sufficiently high to satisfy the legal regulation concerning $NO_x$. The necessary amount of hydrocarbon is, thus, determined from the intended level of $NO_x$ removal and the amount of $NO_x$ as determined from FIG. 3.

Figure 5:
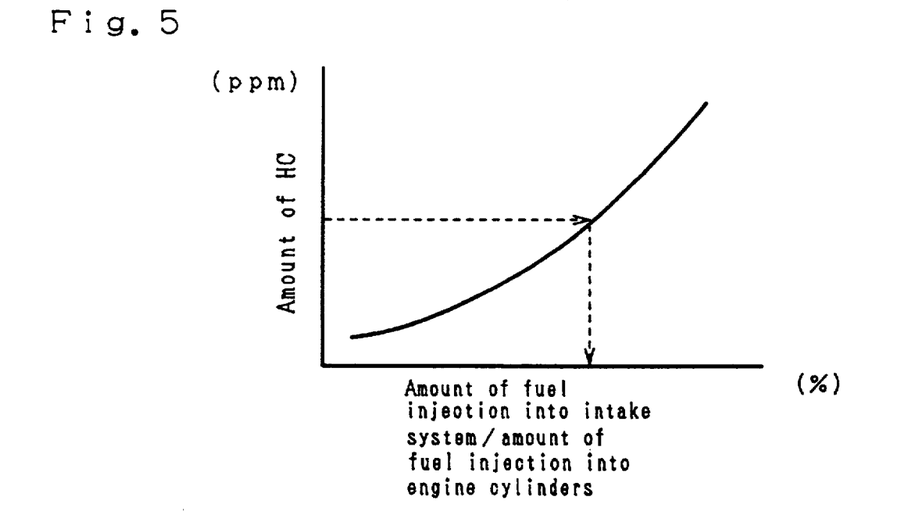
FIG. 5 is a graph showing the amount of hydrocarbon in relation to the ratio of the amount of injection into the intake system of an engine to that of injection into its cylinders.

FIG. 5 shows the ratio of the amount of fuel injection into the intake system to that of fuel injection into the engine cylinders, and the amount of hydrocarbon which is required. FIG. 5 is used for determining the above ratio from the necessary amount of hydrocarbon as determined from FIG. 4. The amount of fuel injection into the engine cylinders is the amount of fuel injected into the engine 3 which depends on the load of the engine. The load of the engine can be ascertained from the number of revolutions of the engine which is determined by the engine rotation sensor 11, and the angle of the control lever which is determined by the control lever sensor 12.

Figure 6:
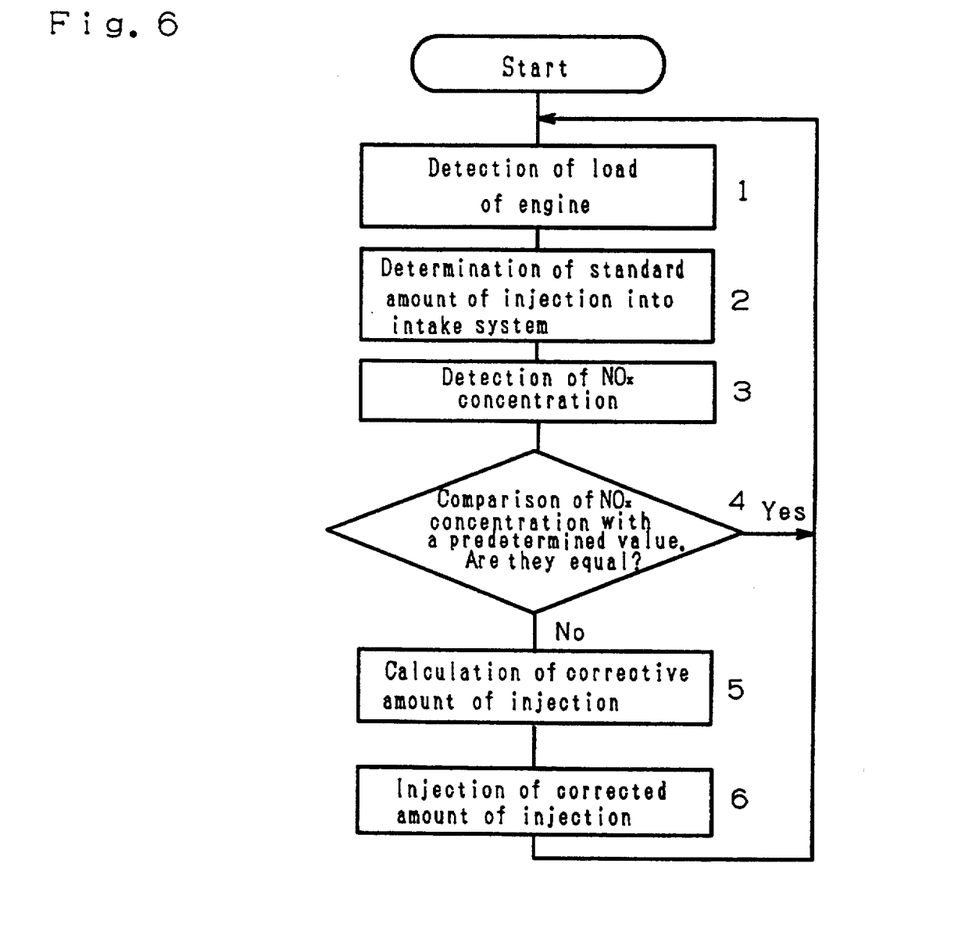
FIG. 6 is a flow chart showing the operation of the apparatus according to the first example.

Attention is now directed to FIG. 6 showing the sequence of operation of the first example of apparatus embodying this invention. The sequence consists of the following steps:

- Step 1: The load of the engine is determined from the number of revolutions of the engine as detected by the engine rotation sensor 11, and the angle of the control lever as detected by the control lever sensor 12.
- Step 2: The standard amount of fuel injection by the injector 14 which is suitable for the load as detected in Step 1 is determined from a map which is prepared beforehand to show different amounts of injection for different loads of the engine.
- Step 3: The amount (or concentration) of $NO_x$ is determined from FIGS. 2 and 3 based on the number of revolutions of the engine and the angle of the control lever which have been detected.
- Step 4: The concentration of $NO_x$ as determined is compared with a predetermined value selected from the range which satisfies the relevant legal standard. The amount of hydrocarbon which is required depends on the predetermined value, as is obvious from FIG. 4. If the concentration as determined coincides with the predetermined value, the operation goes back to Step 1.
- Step 5: If it does not coincide with the predetermined value, a corrective amount of fuel injection by the injector 14 is calculated. The corrective amount is a positive value if there is a shortage of hydrocarbon, while it is a negative value if there is an excess of hydrocarbon.
- Step 6: The standard amount of fuel plus the corrective amount is injected into the intake system by the injector 14.

SECOND EXAMPLE

Figure 7:
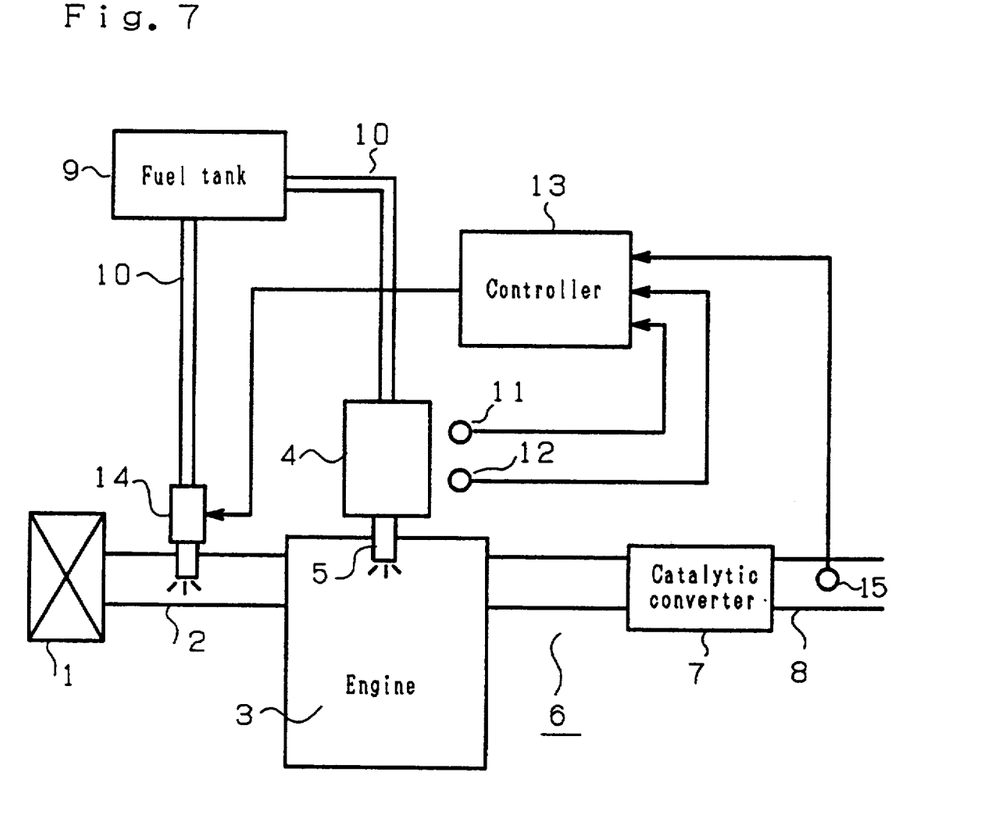
FIG. 7 is a diagram showing a second example of an apparatus embodying this invention.

Reference is now made to FIG. 7 showing a second example of an apparatus embodying this invention. It duplicates the first example shown in FIG. 1, as far as parts 1 to 14 are concerned. It can be distinguished in construction from the apparatus shown in FIG. 1 by further including a sensor 15 for $NO_x$ installed in the outlet portion 8 of the exhaust pipe downstream of the catalytic converter 7.

Figure 8:
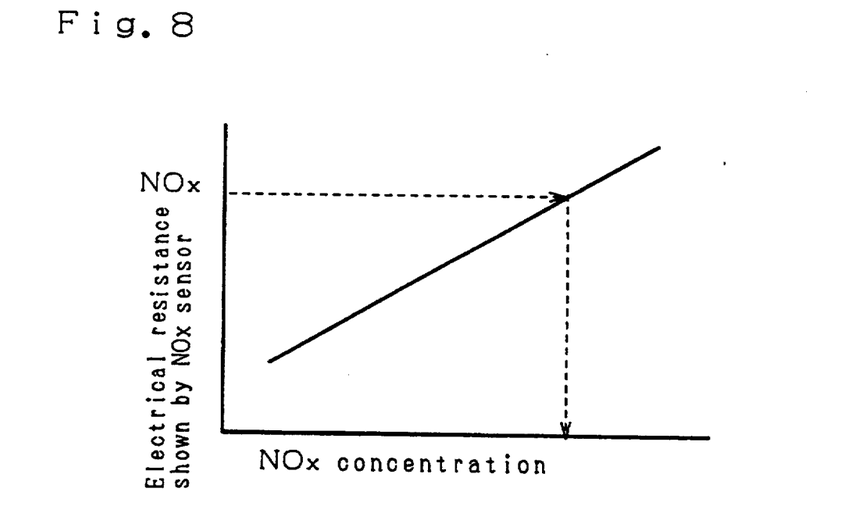
FIG. 8 is a graph showing the characteristics of a sensor for $NO_x$.

FIG. 8 shows the characteristics of the $NO_x$ sensor 15. The sensor 15 has an electrical resistance, and its electrical resistance increases with an increase in the concentration (or amount) of $NO_x$, as shown in FIG. 8. Thus, the concentration of $NO_x$ can be determined from the electrical resistance shown by the sensor 15.

The relationships shown in FIGS. 4 and 5 are applicable to the second example, too.

Figure 9:
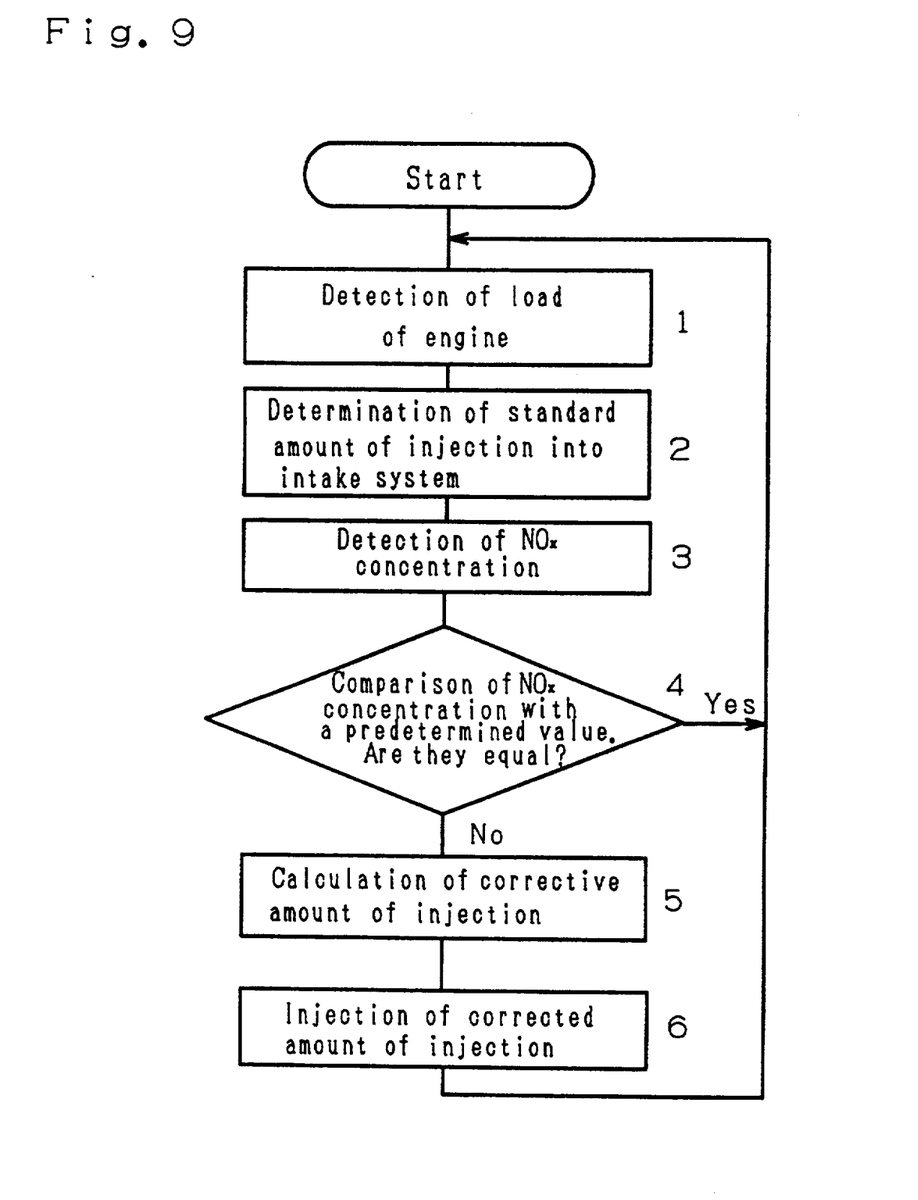
FIG. 9 is a flow chart showing the operation of the apparatus according to the second example.

Attention is now directed to FIG. 9 showing the sequence of operation of the second example of apparatus embodying this invention which consists of the following steps:

Step 1: The load of the engine is determined from the number of revolutions thereof as detected by the engine rotation sensor 11, and the position of the control lever as detected by the control lever sensor 12.

Step 2: The standard amount of fuel injection by the injector 14 which is suitable for the load of the engine as detected in Step 1 is determined from a map which is prepared beforehand to show different amounts of injection for different loads of the engine.

Step 3: The concentration (or amount) of $NO_x$ in the exhaust pipe downstream of the catalytic converter 7 is detected by the $NO_x$ sensor 15 (see FIG. 8).

Step 4: The concentration of $NO_x$ as detected is compared with a predetermined value selected from the range which satisfies the relevant legal regulations. The amount of hydrocarbon which is required depends on the predetermined value, as is obvious from FIG. 4. If the concentration as detected coincides with the predetermined value, the operation goes back to Step 1.

Step 5: If it does not coincide with the predetermined value, a corrective amount of fuel injection by the injector 14 is calculated. The corrective amount is a positive value if there is a shortage of hydrocarbon, while it is a negative value if there is an excess of hydrocarbon.

Step 6: The standard amount of fuel plus the corrective amount is injected into the intake system by the injector 14.

The first and second examples of apparatus embodying this invention are applicable to a diesel engine, or a gasoline engine of the type having fuel injected into its cylinders, as opposed to an ordinary gasoline engine of the type having fuel injected into the intake system.

THIRD EXAMPLE

Figure 10:
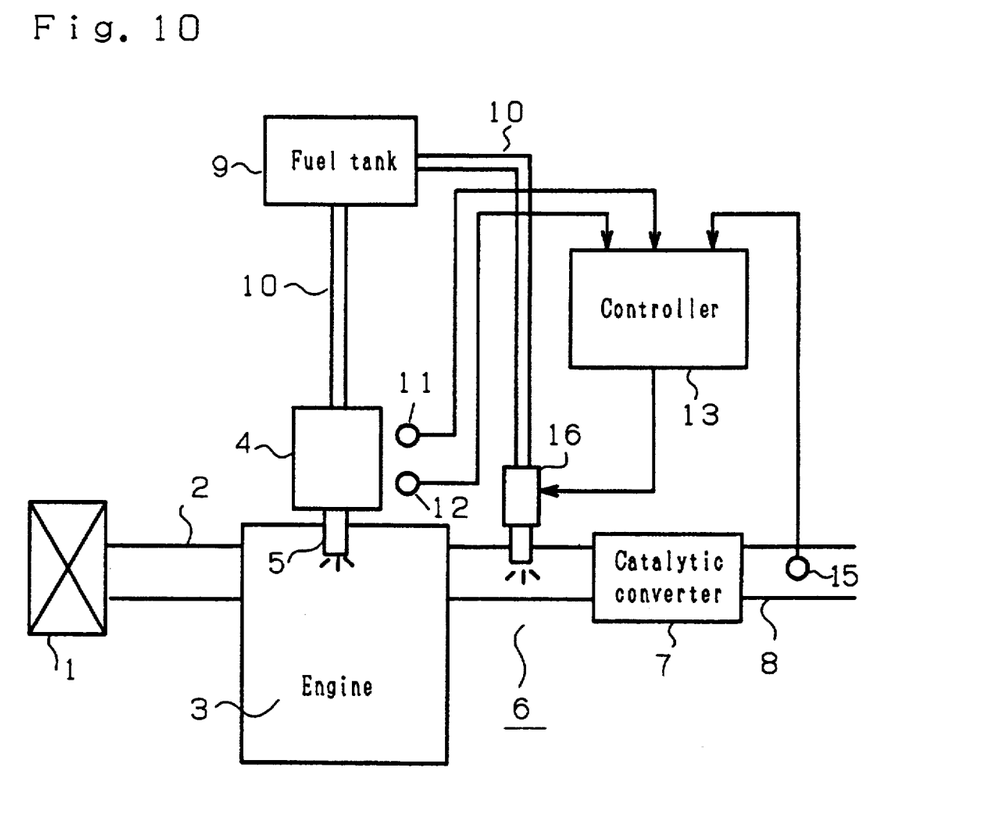
FIG. 10 is a diagram showing a third example of an apparatus embodying this invention.

A third example of an apparatus embodying this invention is shown in FIG. 10. It is identical in construction to the second example of an apparatus shown in FIG. 7, except for a fuel injector 16 associated with the exhaust system, and replacing the injector 14 associated with the intake system. The injector 16 is associated with the exhaust system 6 upstream of the catalytic converter 7.

The injection of fuel into the exhaust system 6 by the injector 16 enables a larger amount of hydrocarbon to be produced in the exhaust system 6 than in any ordinary diesel engine having no such fuel injection. The exhaust gases which are rich in hydrocarbon enter the catalytic converter 7 in which the hydrocarbon has a reducing action on $NO_x$.

The approximate amount of $NO_x$ which the exhaust gases of the engine contain can be estimated from the load of the engine. The estimated amount can be utilized to determine the approximate (or standard) amount of fuel injection by the injector 16. The load of the engine can be ascertained from the number of revolutions thereof as detected by the engine rotation sensor 11, and the angle of the control lever as detected by the control lever sensor 12.

Figure 11:
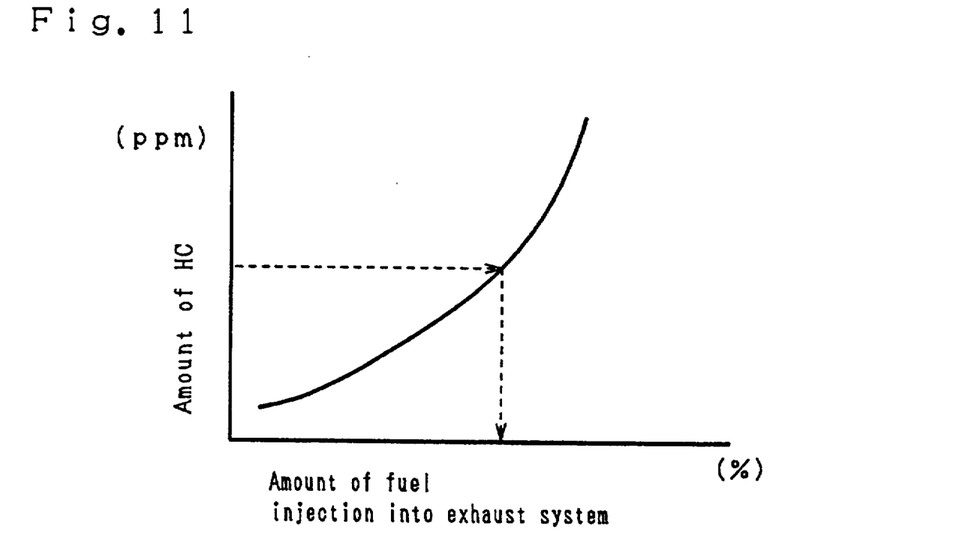
FIG. 11 is a graph showing the amount of hydrocarbon in relation to the amount of injection into the exhaust system of an engine.

FIG. 11 shows the amount of fuel injection into the exhaust system which is required for obtaining the necessary amount of hydrocarbon which is determined from FIG. 4. The $NO_x$ sensor 15 detects the concentration of $NO_x$ in the exhaust gases leaving the catalytic converter 7, as has been described with reference to FIG. 8.

Figure 12:
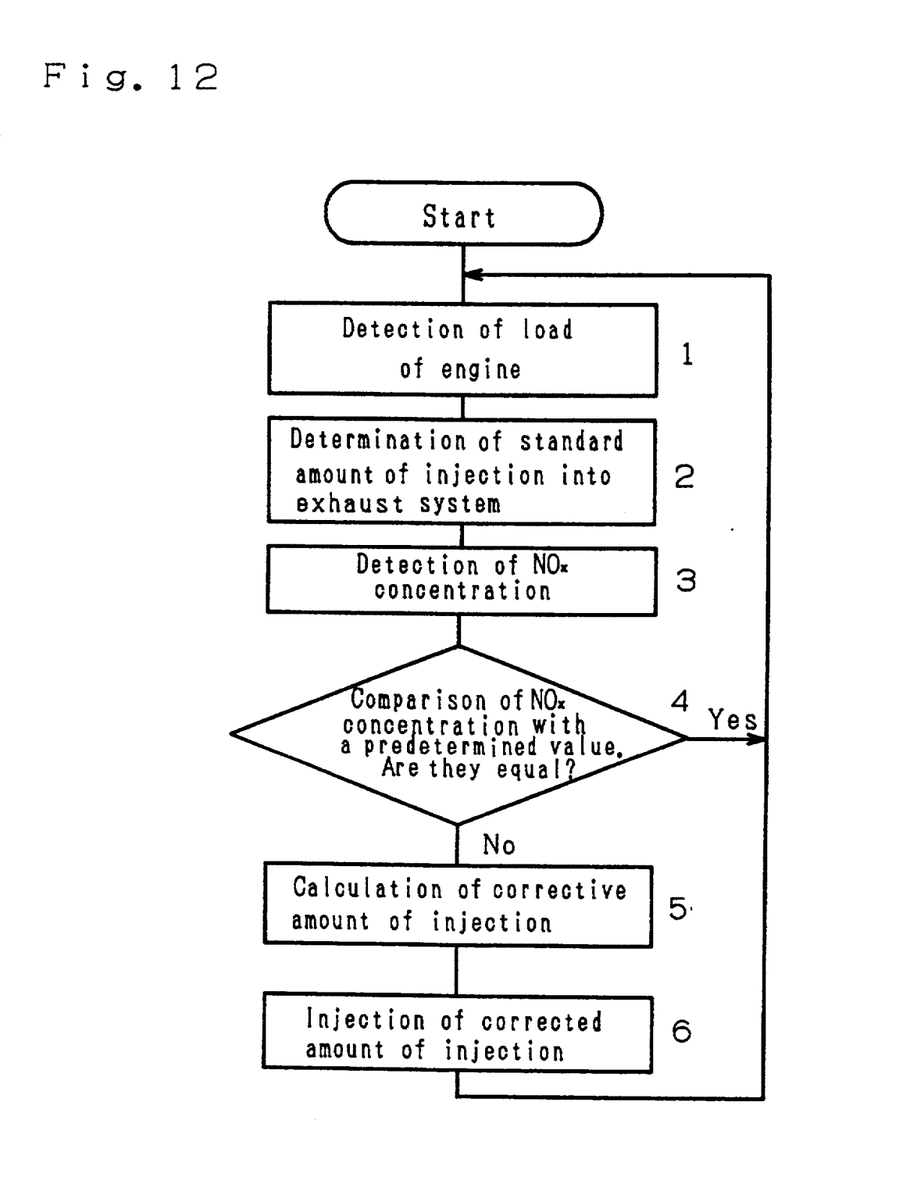
FIG. 12 is a flow chart showing the operation of the apparatus according to the third example.

FIG. 12 shows the sequence of operation of the third example of apparatus embodying this invention which consists of the following steps:

Step 1: The load of the engine is ascertained from the number of revolutions thereof as detected by the engine rotation sensor 11, and the angle of the control lever as detected by the control lever sensor 12.

Step 2: The standard amount of fuel injection by the injector 16 which is suitable for the load of the engine as detected in Step 1 is determined from a map which is prepared beforehand to show different amounts of injection for different loads of the engine.

Step 3: The concentration (or amount) of $NO_x$ in the exhaust pipe downstream of the catalytic converter 7 is detected by the $NO_x$ sensor 15 (see FIG. 8).

Step 4: The concentration of $NO_x$ as detected is compared with a predetermined value selected from the range which satisfies the relevant legal regulations. The amount of hydrocarbon which is required depends on the predetermined value, as is obvious from FIG. 4. If the concentration as detected coincides with the predetermined value, the operation goes back to Step 1.

Step 5: If it does not coincide with the predetermined value, a corrective amount of fuel injection by the injector 16 is calculated. The corrective amount is a positive value if there is a shortage of hydrocarbon, while it is a negative value if there is an excess of hydrocarbon.

Step 6: The standard amount of fuel plus the corrective amount is injected into the exhaust system by the injector 16.

The third example of apparatus embodying this invention is applicable to not only a diesel engine, but also any other type of engine, including an ordinary gasoline engine, since it is into the exhaust system that fuel is injected to produce hydrocarbon as required by the catalytic converter.

What is claimed is:

1. In an apparatus for diminishing the amount of nitrogen oxides in the exhaust gases of an engine of the type having fuel injected into its cylinders, the improvement which comprises an injector associated with the intake system of the engine for injecting fuel into said intake system; means for determining said amount of nitrogen oxides from the number of revolutions of the engine and the angle of a control lever; and means for controlling the amount of fuel injection by said injector in accordance with the load of the engine and said amount of nitrogen oxides as determined.

2. In an apparatus for diminishing the amount of nitrogen oxides in the exhaust gases of an engine of the type having fuel injected into its cylinders, the improvement which comprises an injector associated with the intake system of the engine for injecting fuel into said intake system; a sensor for nitrogen oxides installed in the exhaust system of the engine downstream of a catalytic converter for detecting the concentration of nitrogen oxides in the exhaust gases leaving said converter; and means for controlling the amount of fuel injection by said injector in accordance with the load of the engine and the output of said sensor.

3. In an apparatus for diminishing the amount of nitrogen oxides in the exhaust gases of an engine, the improvement which comprises an injector associated with the exhaust system of the engine for injecting fuel into said exhaust system upstream of a catalytic converter; a sensor for nitrogen oxides installed in said exhaust system downstream of said converter for detecting the concentration of nitrogen oxides in the exhaust gases leaving said converter; and means for controlling the amount of fuel injection by said injector in accordance with the load of the engine and the output of said sensor.

4. In an apparatus for diminishing the amount of nitrogen oxides in exhaust gases of a fuel injected engine having a load applied thereto, said engine having a cylinder, an intake system and an exhaust system, the improvement which comprises an injector associated with one of the intake system and the exhaust system of the engine for injecting fuel into one of said intake and exhaust systems; means for determining the amount of nitrogen oxides in the exhaust gases; and means for controlling the amount of fuel injected by said injector in accordance with the load of the engine and the amount of nitrogen oxides in the exhaust gases.

5. The apparatus defined by claim 4 wherein the means for determining the amount of nitrogen oxides in the exhaust gases of said engine is a sensor for nitrogen oxides installed in the exhaust system of the engine downstream of a catalytic converter.

6. The apparatus defined by claim 5 wherein said injector is associated with the intake system of said engine for injecting fuel into said intake system.

7. The apparatus defined by claim 5 wherein said injector is associated with the exhaust system of said engine for injecting fuel into said exhaust system.

8. The apparatus defined by claim 4 which further comprises a controller, an engine rotation sensor and a control lever sensor, said controller controlling the amount of fuel injected by said injector in accordance with the outputs of said rotation and control lever sensors.

9. The apparatus defined by claim 5 which further comprises a controller, an engine rotation sensor and a control lever sensor, said controller controlling the amount of fuel injected by said injector in accordance with the outputs of said rotation, control lever and nitrogen oxide sensors.

* * * * *